(12) United States Patent
Thibodeaux

(10) Patent No.: US 6,178,650 B1
(45) Date of Patent: Jan. 30, 2001

(54) TRAILER HITCH POSITIONING SYSTEM

(76) Inventor: Joseph I. Thibodeaux, P.O. Box 119, Angola, LA (US) 70712

(*) Notice: Under 35 U.S.C. 154(b), the term of this patent shall be extended for 0 days.

(21) Appl. No.: 09/352,961

(22) Filed: Jul. 14, 1999

(51) Int. Cl.[7] .............................. G01C 15/00; B60D 1/00
(52) U.S. Cl. .................................. 33/286; 33/264; 33/263; 340/431; 340/435; 280/477
(58) Field of Search .................. 33/286, 263, 264, 33/613, 645; 116/28 R; 340/282, 431, 435; 280/477

(56) References Cited

U.S. PATENT DOCUMENTS

| | | | |
|---|---|---|---|
| 3,901,536 | * 8/1975 | Black | 340/282 |
| 4,552,376 | * 11/1985 | Cofer | 33/264 |
| 4,687,220 | * 8/1987 | Danielson | 116/28 R |
| 4,723,788 | * 2/1988 | Suter | 116/28 R |
| 4,852,901 | * 8/1989 | Beasley et al. | 280/477 |
| 4,856,200 | * 8/1989 | Riggs | 33/264 |
| 4,938,495 | * 7/1990 | Beasley et al. | 280/477 |
| 5,036,593 | 8/1991 | Collier | 33/264 |
| 5,115,572 | * 5/1992 | Harbison | 33/613 |
| 5,191,328 | 3/1993 | Nelson | 340/870 |
| 5,224,270 | 7/1993 | Burrus | 33/264 |
| 5,269,554 | 12/1993 | Law et al. | 280/477 |
| 5,274,432 | * 12/1993 | Parent | 33/264 |
| 5,285,205 | 2/1994 | White | 340/435 |
| 5,290,056 | 3/1994 | Fath, IV | 280/477 |
| 5,309,289 | * 5/1994 | Johnson | 33/264 |
| 5,455,557 | 10/1995 | Noll et al. | 340/431 |
| 5,461,471 | * 10/1995 | Sommerfeld | 33/264 |
| 5,513,870 | * 5/1996 | Hickman | 280/477 |
| 5,518,263 | * 5/1996 | Owens | 280/477 |
| 5,558,352 | * 9/1996 | Mills | 280/477 |
| 5,657,175 | * 8/1997 | Brewington | 280/477 |
| 5,669,621 | * 9/1997 | Lockwood | 280/477 |
| 5,680,706 | * 10/1997 | Talcott | 33/286 |
| 5,927,229 | * 7/1999 | Karr, Jr. | 116/28 R |
| 5,970,619 | * 10/1999 | Wells | 33/264 |
| 6,100,795 | * 8/2000 | Otterbacher et al. | 340/431 |
| 6,100,796 | * 8/2000 | Wagner et al. | 340/435 |

* cited by examiner

Primary Examiner—Diego Gutierrez
Assistant Examiner—Yaritza Guadalupe
(74) Attorney, Agent, or Firm—Joseph N. Breaux

(57) ABSTRACT

A trailer hitch positioning system that provides a visual and an audible indication to a vehicle driver of the position of the trailer ball with respect to the tongue of the trailer. The trailer hitch positioning system includes a pinpoint light source assembly, a light beam sensing array assembly, and a passenger compartment display unit wherein a pinpoint beam from the pinpoint light source assembly strikes and activates light beam sensors within the light beam sensing array assembly, the activations of the light beam sensors being detected by a digital controller within the display unit which then provides a corresponding positional information output to the vehicle driver through an LED display and an audible alerting buzzer.

2 Claims, 4 Drawing Sheets

TRAILER HITCH POSITIONING SYSTEM

TECHNICAL FIELD

The present invention relates to trailer/vehicle connecting aids and more particularly to a trailer hitch positioning system that includes a pinpoint light source assembly, a light beam sensing array assembly, a sonic proximity sensor, a proximity sensor reflector plate and a passenger compartment display unit wherein a pinpoint beam from the pinpoint light source assembly strikes and activates light beam sensors within the light beam sensing array assembly, the activations of the light beam sensors being detected by a digital controller within the display unit which then provides a corresponding positional information output to the vehicle driver through an LED display, the sonic proximity sensor being in connection with the digital controller and emitting and receiving sonic signals toward and from the proximity sensor reflector plate to determine the distance between the sonic proximity sensor and the proximity sensor reflector plate, the digital controller receiving a distance signal input from the sonic proximity sensor and activating an audible alerting buzzer in connection with the digital controller when the distance signal input reaches a predetermined triggering level; the pinpoint light source assembly including a pinpoint light source providing a pinpoint light beam and being pivotally mounted onto a magnetic light source base; the proximity sensor reflector plate being mounted to the magnetic light source base; the light beam sensing array assembly including a number of light beam sensors and a housing having a corresponding number of light beam sensor windows, one positioned over each light beam sensor, and a rubberized magnetic back surface; each light beam sensor being activated when the pin point light beam of the pin point light source id focused thereon; the sonic proximity sensor being mounted to a top surface of the housing of the light beam sensing array; the passenger compartment display unit including a display unit housing, a digital controller housed within the display unit housing, a buzzer grate, a power adapter in connection with the digital controller, and display unit indicator LED's including: an "on center" LED, first, second, and third "right of center" LED's, and the first, second, and third "left of center" LED's; the digital controller being in input receiving connection with the number of light sensor elements positioned behind the light beam sensor windows and in output connection with the "on center" LED; the first, second, and third "right of center" LED's; the first, second, and third "left of center" LED's; and the alerting buzzer; the digital controller selectively activating the "on center" LED; the first, second, and third "right of center" LED's; and the first, second, and third "left of center" LED's in response to activation of predetermined ones of the number of light sensor elements.

BACKGROUND ART

Many individuals find it difficult to position the ball of a trailer hitch beneath the tongue of a trailer when attempting to connect the trailer to the vehicle. It would be a benefit, therefore, to have a trailer hitch positioning system that provided a visual and/or an audible indication to the vehicle driver of the position of the trailer ball with respect to the tongue of the trailer.

GENERAL SUMMARY DISCUSSION OF INVENTION

It is thus an object of the invention to provide a trailer hitch positioning system that provides a visual indication to a vehicle driver of the position of the trailer ball with respect to the tongue of the trailer.

It is a further object of the invention to provide a trailer hitch positioning system that provides an audible indication to a vehicle driver of the position of the trailer ball with respect to the tongue of the trailer.

It is a still further object of the invention to provide a trailer hitch positioning system that includes a pinpoint light source assembly, a light beam sensing array assembly, a sonic proximity sensor, a proximity sensor reflector plate and a passenger compartment display unit wherein a pinpoint beam from the pinpoint light source assembly strikes and activates light beam sensors within the light beam sensing array assembly, the activations of the light beam sensors being detected by a digital controller within the display unit which then provides a corresponding positional information output to the vehicle driver through an LED display, the sonic proximity sensor being in connection with the digital controller and emitting and receiving sonic signals toward and from the proximity sensor reflector plate to determine the distance between the sonic proximity sensor and the proximity sensor reflector plate, the digital controller receiving a distance signal input from the sonic proximity sensor and activating an audible alerting buzzer in connection with the digital controller when the distance signal input reaches a predetermined triggering level; the pinpoint light source assembly including a pinpoint light source providing a pinpoint light beam and being pivotally mounted onto a magnetic light source base; the proximity sensor reflector plate being mounted to the magnetic light source base; the light beam sensing array assembly including a number of light beam sensors and a housing having a corresponding number of light beam sensor windows, one positioned over each light beam sensor, and a rubberized magnetic back surface; each light beam sensor being activated when the pin point light beam of the pin point light source id focused thereon; the sonic proximity sensor being mounted to a top surface of the housing of the light beam sensing array; the passenger compartment display unit including a display unit housing, a digital controller housed within the display unit housing, a buzzer grate, a power adapter in connection with the digital controller, and display unit indicator LED's including: an "on center" LED, first, second, and third "right of center" LED's, and the first, second, and third "left of center" LED's; the digital controller being in input receiving connection with the number of light sensor elements positioned behind the light beam sensor windows and in output connection with the "on center" LED; the first, second, and third "right of center" LED's; the first, second, and third "left of center" LED's; and the alerting buzzer; the digital controller selectively activating the "on center" LED; the first, second, and third "right of center" LED's; and the first, second, and third "left of center" LED's in response to activation of predetermined ones of the number of light sensor elements.

It is a still further object of the invention to provide a trailer hitch positioning system that accomplishes some or all of the above objects in combination.

Accordingly, a trailer hitch positioning system is provided. The trailer hitch positioning system includes a pinpoint light source assembly, a light beam sensing array assembly, a sonic proximity sensor, a proximity sensor reflector plate and a passenger compartment display unit wherein a pinpoint beam from the pinpoint light source assembly strikes and activates light beam sensors within the light beam sensing array assembly, the activations of the light beam sensors being detected by a digital controller within the display unit which then provides a corresponding positional information output to the vehicle driver through an LED display, the sonic proximity sensor being in connection with the digital controller and emitting and receiving sonic signals toward and from the proximity sensor reflector plate to determine the distance between the sonic proximity sensor and the proximity sensor reflector plate, the digital controller receiving a distance signal input from the sonic proximity sensor and activating an audible alerting buzzer in connection with the digital controller when the distance signal input reaches a predetermined triggering level; the pinpoint light source assembly including a pinpoint light source providing a pinpoint light beam and being pivotally mounted onto a magnetic light source base; the proximity sensor reflector plate being mounted to the magnetic light source base; the light beam sensing array assembly including a number of light beam sensors and a housing having a corresponding number of light beam sensor windows, one positioned over each light beam sensor, and a rubberized magnetic back surface; each light beam sensor being activated when the pin point light beam of the pin point light source is focused thereon; the sonic proximity sensor being mounted to a top surface of the housing of the light beam sensing array; the passenger compartment display unit including a display unit housing, a digital controller housed within the display unit housing, a buzzer grate, an audible alerting buzzer, a power adapter in connection with the digital controller, and display unit indicator LED's including: an "on center" LED, first, second, and third "right of center" LED's, and the first, second, and third "left of center" LED's; the digital controller being in input receiving connection with the number of light sensor elements positioned behind the light beam sensor windows and in output connection with the "on center" LED; the first, second, and third "right of center" LED's; the first, second, and third "left of center" LED's; the digital controller selectively activating the "on center" LED; the first, second, and third "right of center" LED's; and the first, second, and third "left of center" LED's in response to activation of predetermined ones of the number of light sensor elements.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
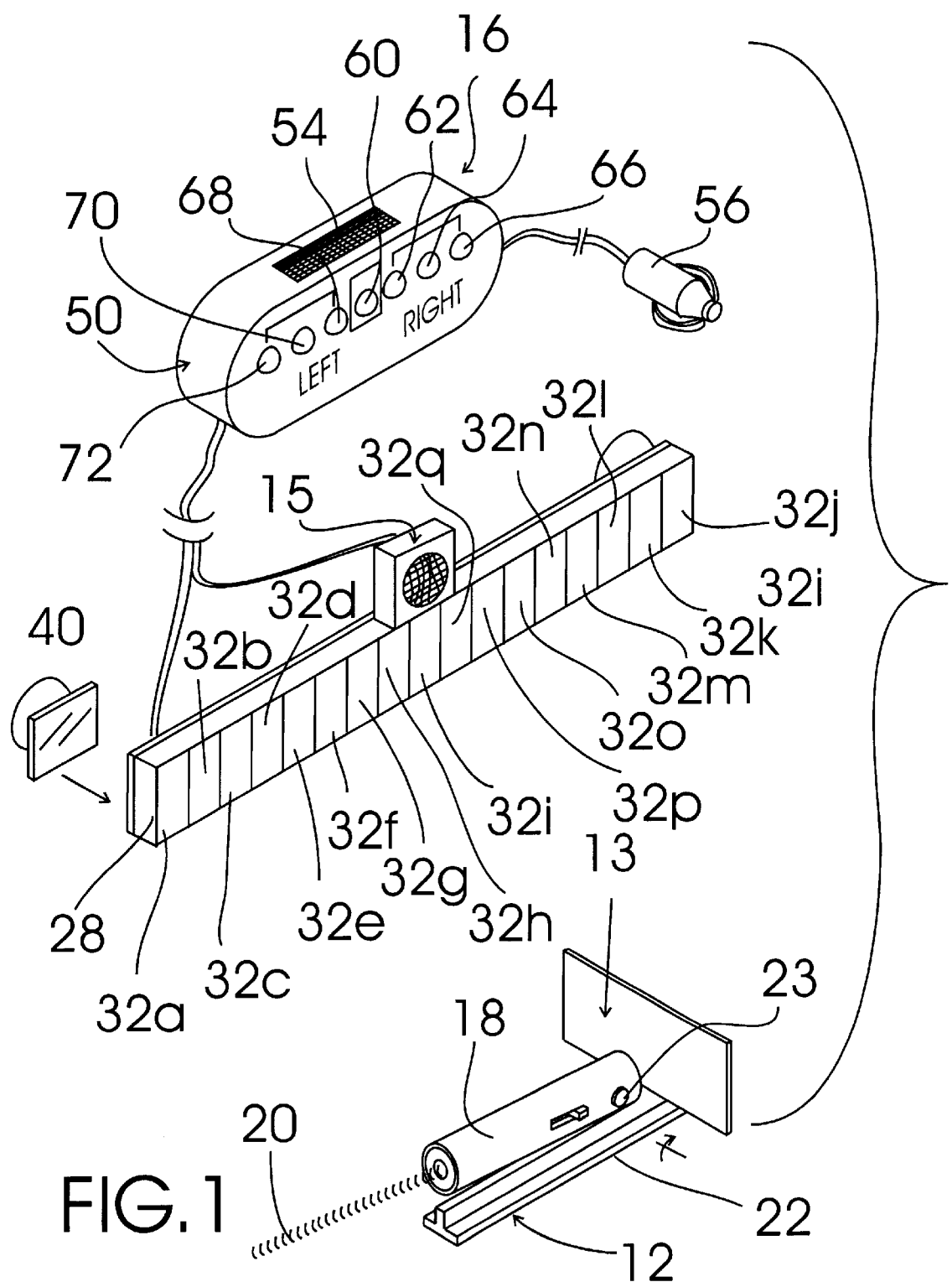
FIG. 1 a perspective view of an exemplary embodiment of the trailer hitch positioning system of the present invention showing the pinpoint light source assembly including the pinpoint light source pivotally mounted onto the magnetic light source base; the light beam sensing array assembly including the light beam sensor windows, one positioned over each light beam sensor, the rubberized magnetic back surface and the two optional magnetically attachable suction cup assemblies; the sonic proximity sensor; the proximity sensor reflector plate and the passenger compartment display unit including the display unit housing, the buzzer grate, the alerting buzzer, the power adapter, and the display unit indicator LED's including the "on center" LED, the first, second, and third "right of center" LED's, and the first, second, and third "left of center" LED's.
Figure 2:
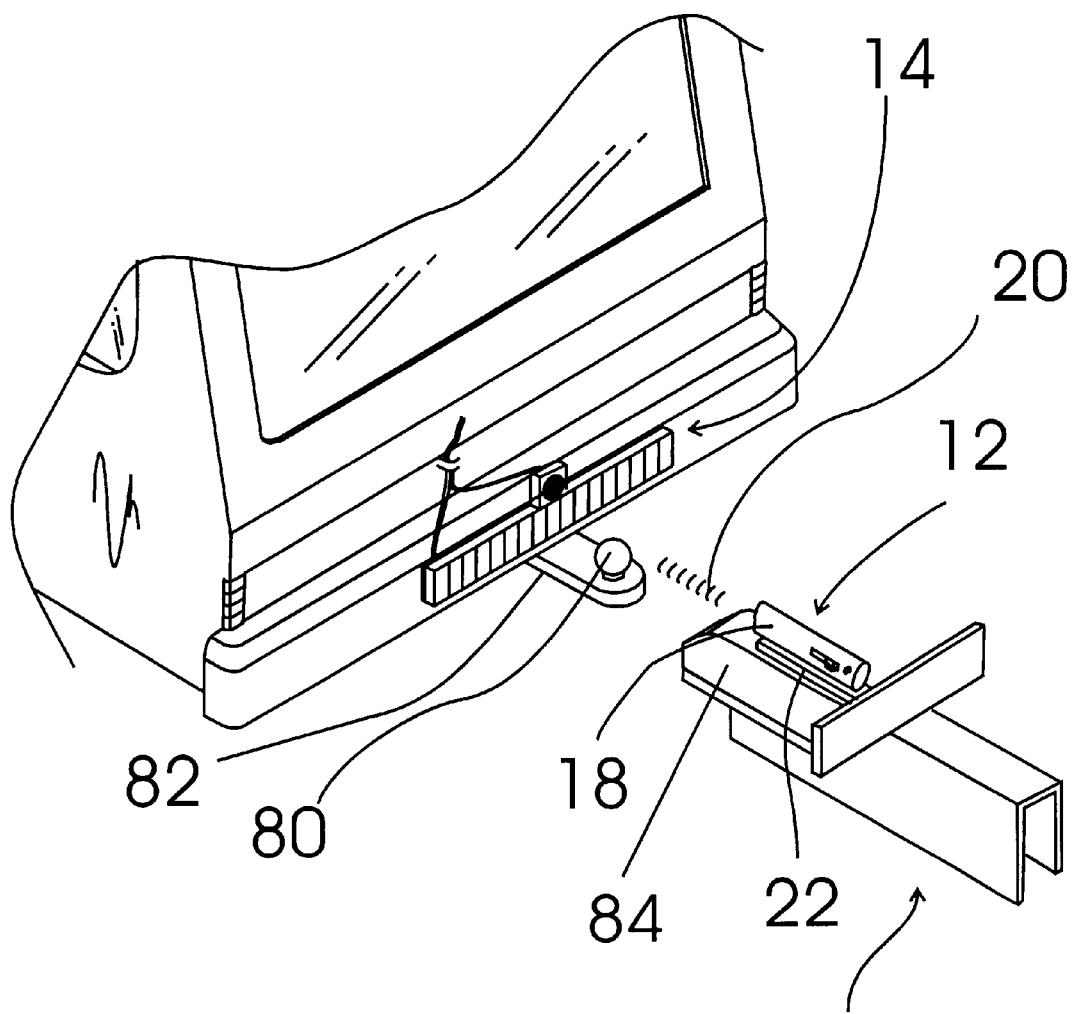
FIG. 2 is a partial perspective view of the rear hitch assembly of a representative vehicle and the tongue of a representative trailer showing the magnetic base of the pinpoint light source assembly attached to the trailer behind the tongue with the pinpoint light source pivoted to aim the pinpoint light beam at the height at which the light beam sensing array assembly is magnetically attached to the bumper of the vehicle with the center light beam sensing window of the light beam sensing array assembly positioned in alignment with the ball of the trailer hitch and the sonic proximity sensor aimed at the proximity sensor reflector plate.

FIG. 1 shows an exemplary embodiment of the trailer hitch positioning system of the present invention generally designated 10. Trailer hitch positioning system 10 includes a pinpoint light source assembly, generally designated 12; a proximity sensor reflector plate, generally designated 13; a light beam sensing array assembly, generally designated 14; a sonic proximity sensor, generally designated 15; and a passenger compartment display unit, generally designated 16. Pinpoint light source assembly 12 includes a conventional laser diode pointer pinpoint light source 18 that provides a pinpoint light beam 20 and that is pivotally mounted with a pivot pin 23 to a magnetic light source base 22 that, with reference to FIG. 2, is used to attach pinpoint light source assembly 12 to the tongue portion 24 of a trailer. Proximity sensor reflector plate 13 is a metal plate secured perpendicularly to the back end of magnetic light source base 22. Pivotally mounting the pinpoint light source 18 allows for angular adjustments to ensure light beam 20 strikes light beam sensing array assembly 14.

Figure 3:
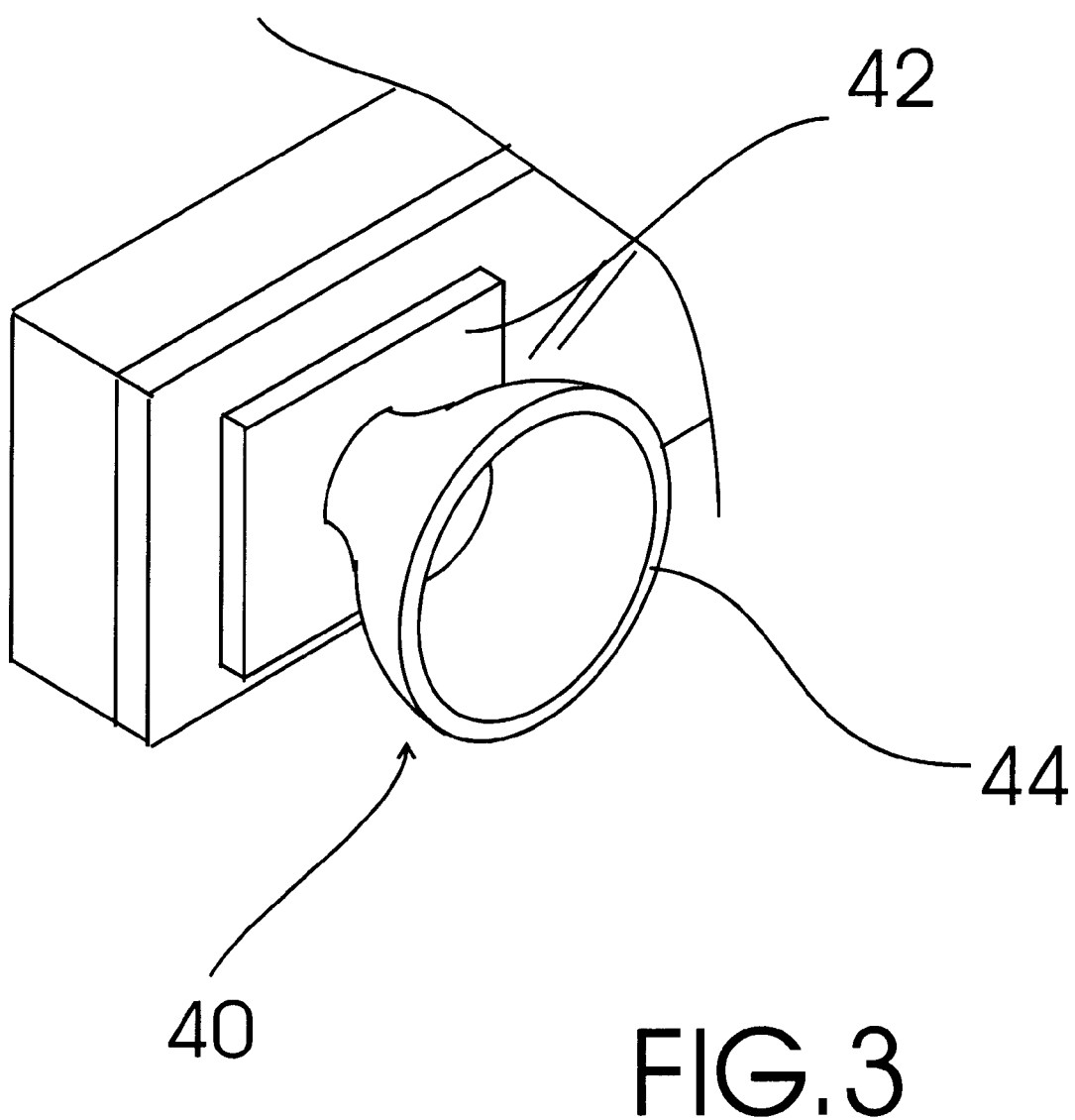
FIG. 3 is partial perspective view of one of the optional magnetically attachable suction cup assemblies magnetically attached to the rubberized magnetic back surface of the light beam sensing array assembly and showing the rectangular metal attachment plate and the suction cup.

Referring back to FIG. 1, light beam sensing array assembly 14 includes seventeen light beam sensors 30a–q (FIG. 4), in this embodiment conventional phototransistor circuits, a housing 28 having seventeen light beam sensor windows 32a–q, one positioned over each light beam sensor 30a–q (FIG. 4), a rubberized magnetic back surface 36, and the sonic proximity sensor 15 secured to a top surface of housing 28. Rubberized magnet back surface 36 is used to attach housing 28 to magnetically attractable metal structures of the vehicle above the trailer hitch ball, if available. If such structures are unavailable, light beam sensing array assembly 14 includes two magnetically attachable suction cup assemblies, generally designated 40, that are used to attach housing 28 to any smooth flat surface. With reference to FIG. 3, each magnetically attachable suction cup assemblies 40 includes a metal attachment plate 42 and a suction cup 44 extending from attachment plate 42. Attachment plate 42 is formed from a magnetically attractable metal and attaches to rubberized magnet back surface 36 of housing 28.

Passenger compartment display unit 16 includes a display unit housing, generally designated 50; a digital controller, generally designated 52 (FIG. 4), housed within display unit housing 50; a buzzer grate 54; a power adapter 56 in connection with digital controller 54 (FIG. 4); an alerting buzzer 55 (FIG. 4); sonic alerting buzzer 15 and display unit indicator LED's including: an "on center" LED 60, first, second, and third "right of center" LED's 62,64,66, and first, second, and third "left of center" LED's 68,70,72.

Figure 4:
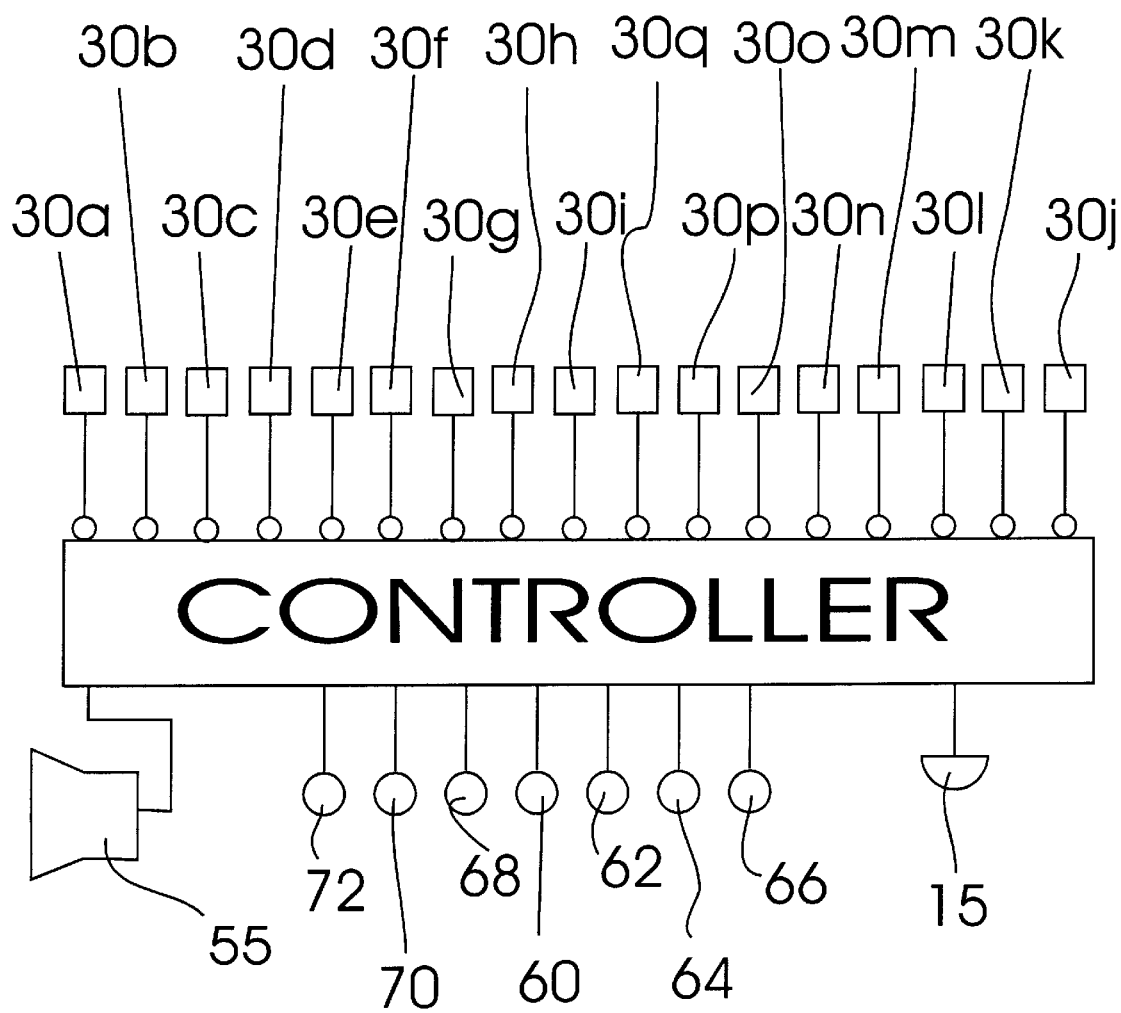
FIG. 4 is a schematic diagram of the digital controller of the trailer hitch positioning system housed within the display unit housing of the passenger compartment display unit and in input receiving connection with the seventeen light sensor elements positioned within the light beam sensing array assembly, one behind each light beam sensor windows; in input and output connection with the sonic proximity sensor; and in output connection with the "on center" LED; the first, second, and third "right of center" LED's; and the first, second, and third "left of center" LED's.

With reference to FIG. 4, digital controller 54 is in input receiving connection with light sensor elements 30*a*–*q*, respectively positioned behind light beam sensor windows 32*a*–*q* (FIG. 1) and in output connection with "on center" LED 60; the first, second, and third "right of center" LED's 62,64,66; the first, second, and third "left of center" LED's 68,70,72; and alerting buzzer 55.

Digital controller 54 selectively activates the "on center" LED 60 when light sensor element 30i is activated; first "right of center" LED 62 in response to activation any of light sensor elements 30*p*,30*q*; second "right of center" LED 64 in response to activation any of light sensor elements 30*m*,30*n*,30*o*; third "right of center" LED 66 in response to activation any of light sensor elements 30*j*,30*k*,30*l*; first "left of center" LED 68 in response to activation any of light sensor elements 30*g*,30*h*; second "left of center" LED 70 in response to activation any of light sensor elements 30*d*,30*e*, 30*f*; and third "left of center" LED 72 in response to activation any of light sensor elements 30*a*,30*b*,30*c*. Digital controller 54 activates the audible alerting buzzer 55 when a distance signal input received from the sonic proximity sensor 15 reaches a predetermined threshold state indicating when the distance signal input reaches a predetermined triggering level.

With general reference to FIGS. 1–4, in use, a driver is greatly assisted in positioning the ball 80 (FIG. 2) of a trailer hitch 82 beneath the ball connecting portion 84 of trailer tongue 24 by viewing and listening to display unit 16 of trailer hitch positioning system 10.

It can be seen from the preceding description that a trailer hitch positioning system has been provided that provides a visual indication to a vehicle driver of the position of the trailer ball with respect to the tongue of the trailer; that provides an audible indication to a vehicle driver of the position of the trailer ball with respect to the tongue of the trailer; and that includes a pinpoint light source assembly, a light beam sensing array assembly, a sonic proximity sensor, a proximity sensor reflector plate and a passenger compartment display unit wherein a pinpoint beam from the pinpoint light source assembly strikes and activates light beam sensors within the light beam sensing array assembly, the activations of the light beam sensors being detected by a digital controller within the display unit which then provides a corresponding positional information output to the vehicle driver through an LED display, the sonic proximity sensor being in connection with the digital controller and emitting and receiving sonic signals toward and from the proximity sensor reflector plate to determine the distance between the sonic proximity sensor and the proximity sensor reflector plate, the digital controller receiving a distance signal input from the sonic proximity sensor and activating an audible alerting buzzer in connection with the digital controller when the distance signal input reaches a predetermined triggering level; the pinpoint light source assembly including a pinpoint light source providing a pinpoint light beam and being pivotally mounted onto a magnetic light source base; the proximity sensor reflector plate being mounted to the magnetic light source base; the light beam sensing array assembly including a number of light beam sensors and a housing having a corresponding number of light beam sensor windows, one positioned over each light beam sensor, and a rubberized magnetic back surface; each light beam sensor being activated when the pin point light beam of the pin point light source id focused thereon; the sonic proximity sensor being mounted to a top surface of the housing of the light beam sensing array; the passenger compartment display unit including a display unit housing, a digital controller housed within the display unit housing, a buzzer grate, an audible alerting buzzer, a power adapter in connection with the digital controller, and display unit indicator LED's including: an "on center" LED, first, second, and third "right of center" LED's, and the first, second, and third "left of center" LED's; the digital controller being in input receiving connection with the number of light sensor elements positioned behind the light beam sensor windows and in output connection with the "on center" LED; the first, second, and third "right of center" LED's; and the first, second, and third "left of center" LED's; the digital controller selectively activating the "on center" LED; the first, second, and third "right of center" LED's; and the first, second, and third "left of center" LED's in response to activation of predetermined ones of the number of light sensor elements.

It is noted that the embodiment of the trailer hitch positioning system described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A trailer hitch positioning system comprising:

a pinpoint light source assembly;

a light beam sensing array assembly;

a sonic proximity sensor;

a proximity sensor reflector plate; and a passenger compartment display unit wherein a pinpoint beam from said pinpoint light source assembly strikes and activates light beam sensors within said light beam sensing array assembly, activations of said light beam sensors being detected by a digital controller within said display unit which then provides a corresponding positional information output to the vehicle driver through an LED display;

said sonic proximity sensor being in connection with said digital controller and emitting and receiving sonic signals toward and from said proximity sensor reflector plate to determine a distance between said sonic proximity sensor and said proximity sensor reflector plate;

said digital controller receiving a distance signal input from said sonic proximity sensor and activating an audible alerting buzzer in connection with said digital controller when said distance signal input reaches a predetermined triggering level;

said pinpoint light source assembly including a pinpoint light source providing a pinpoint light beam and being pivotally mounted onto a magnetic light source base;

said proximity sensor reflector plate being mounted to said magnetic light source base;

said light beam sensing array assembly including a number of light beam sensors and a housing having a corresponding number of light beam sensor windows, one positioned over each light beam sensor, and a rubberized magnetic back surface; each light beam sensor being activated when said pin point light beam of said pin point light source id focused thereon;

said sonic proximity sensor being mounted to a top surface of said housing of said light beam sensing array;

said passenger compartment display unit including a display unit housing, a digital controller housed within said display unit housing, a buzzer grate, said audible alerting buzzer, a power adapter in connection with said digital controller, and display unit indicator LED's including: an "on center" LED, first, second, and third "right of center" LED's, and a first, second, and third "left of center" LED's; said digital controller being in input receiving connection with said number of light sensor elements positioned behind said light beam sensor windows and in output connection with said "on center" LED; said first, second, and third "right of center" LED's; and said first, second, and third "left of center" LED's;

said digital controller selectively activating said "on center" LED; said first, second, and third "right of center" LED's; and said first, second, and third "left of center" LED's in response to activation of predetermined ones of said number of light sensor elements.

2. The trailer hitch positioning system of claim 1 further comprising:

two magnetically attachable suction cup assemblies that are magnetically attachable to said rubberized magnetic back surface of said light beam sensing array assembly; each said magnetically attachable suction cup assembly a metal attachment plate and a suction cup extending from one side of said metal attachment plate.

\* \* \* \* \*